United States Patent
Kasahara et al.

(10) Patent No.: US 6,849,357 B1
(45) Date of Patent: Feb. 1, 2005

(54) BATTERY, A PROCESS FOR PRODUCING THE BATTERY, A PROCESS FOR PRODUCING A BATTERY CASE, AND A BATTERY PACK

(75) Inventors: Hideki Kasahara, Naka-gun (JP); Masumi Katsumoto, Chigasaki (JP); Masaharu Miyahisa, Fujisawa (JP); Yoshihiro Boki, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 663 days.

(21) Appl. No.: 09/937,139

(22) PCT Filed: Nov. 28, 2000

(86) PCT No.: PCT/JP00/08373

§ 371 (c)(1),
(2), (4) Date: Sep. 21, 2001

(87) PCT Pub. No.: WO02/03484

PCT Pub. Date: Jan. 10, 2002

(30) Foreign Application Priority Data

Jul. 4, 2000 (JP) ........................................ 2000-201881
Jul. 31, 2000 (JP) ........................................ 2000-230454

(51) Int. Cl.⁷ .............................................. H01M 2/00
(52) U.S. Cl. ...................... 429/163; 429/164; 429/165; 429/166; 429/167; 429/175; 429/176; 429/131; 429/133; 429/149; 429/157; 29/623.1; 29/623.2; 29/730
(58) Field of Search ................................ 429/131, 133, 429/149, 151, 152, 153, 156, 157, 163, 164, 165, 166, 167, 176, 185, 175; 29/623.1, 623.2, 730

(56) References Cited

U.S. PATENT DOCUMENTS

| 3,537,907 | A | | 11/1970 | Wilson |
| 4,507,368 | A | | 3/1985 | Hashimoto |
| 5,490,867 | A | | 2/1996 | Kozawa et al. |
| 5,537,733 | A | * | 7/1996 | Kozawa et al. ............ 29/623.5 |
| 5,556,722 | A | | 9/1996 | Narukawa et al. |
| 6,174,620 | B1 | * | 1/2001 | Okada et al. ............... 429/176 |
| 6,264,708 | B1 | * | 7/2001 | Haraguchi et al. ......... 29/623.2 |
| 6,573,000 | B1 | * | 6/2003 | Miyazaki et al. ........... 429/185 |

FOREIGN PATENT DOCUMENTS

| EP | 0994523 A1 | 4/2000 |
| JP | 60056376 | 4/1985 |
| JP | 63221551 | 9/1988 |
| JP | 7014616 | 1/1995 |
| JP | 9266012 | 10/1997 |
| WO | 9411908 | 5/1994 |
| WO | 9919918 | 4/1999 |
| WO | 0002278 | 1/2000 |
| WO | 0103231 A1 | 1/2001 |

OTHER PUBLICATIONS

International Search Report dated Mar. 28, 2001.

* cited by examiner

*Primary Examiner*—Bruce F. Bell
(74) *Attorney, Agent, or Firm*—Stevens, Davis, Miller & Mosher, LLP.

(57) ABSTRACT

The present invention relates to a battery using a case of which the section of the lower part containing an electric element is square or hexagonal and the section of the upper part containing a sealing plate is circular or elliptic. By virtue of the shape of the lower part the space efficiency of the battery pack is enhanced and by virtue of the shape of the upper part the productivity of the battery is improved. Further, preferably, the corners of the lower part of the case are rounded or chamferred, whereby the temperature rise in the battery pack is suppressed.

14 Claims, 11 Drawing Sheets

BATTERY, A PROCESS FOR PRODUCING THE BATTERY, A PROCESS FOR PRODUCING A BATTERY CASE, AND A BATTERY PACK

TECHNICAL FIELD

The present invention relates to a battery, a process for producing the battery, a process for producing a battery case, and a battery pack.

BACKGROUND ART

In recent years, with the advance of various portable appliances, great importance has been being placed to the development of batteries as one of the important key devices thereof. In particular, rechargeable secondary batteries, which are used in a variety of appliances including portable telephones, notebook-sized personal computers and further, in recent years, hybrid electric automobiles have been increasingly requested on the market.

The shape of batteries generally used at present is a cylindrical pillar or a square pillar.

Cylindrical pillar batteries, when used to construct a battery pack housing several batteries, give a poor space efficiency. On the other hand, square pillar batteries have a difficulty in the production step thereof though they give a high space efficiency in the pack. That is, the met hod used in laser-welding processing for sealing requires a controlling means for stabilizing the laser, additionally causing increase in production cost.

In a square pillar battery disclosed in JP-A-63-221551 or a hexagonal pillar battery disclosed in JP-A-9-266012, the battery is sealed by caulking the sealing plate with the case. In this method, however, strain develops at the corner part and hence the tightness of sealing is poorer than when a cylindrical pillar battery is sealed by caulking.

DISCLOSURE OF INVENTION

The object of the present invention is, overcoming the above-mentioned problems, to provide a battery which is improved in productivity and improved in space efficiency when constructed into a battery pack or when mounted on appliances.

To attain the above-mentioned object, the battery of the present invention comprises an electric element, a case having an opening and a sealing plate, the opening being sealed with the sealing plate, wherein the case comprises a lower part comprising the electric element and an upper part comprising the sealing plate, the section of the lower part being square or hexagonal and the section of the upper part being circular or elliptic.

By making the structure of the section of the lower part containing the electric element square or hexagonal as described above, that is to say, by making the shape of the main part of the case a square barrel or a hexagonal barrel, the space efficiency in constructing a battery pack or in mounting it on appliances can be improved.

Furthermore, by making the shape of the section of the upper part of the opening circular or elliptic, the development of strain at the corner of the case can be obviated even when a sealing plate is attached thereto by caulking, whereby the productivity of batteries can be enhanced and the tightness of sealing of batteries can be improved.

The square of the section of the lower part mentioned above may be either a true square or a rectangle.

The electric element used may be those which are formed of a positive electrode, a negative electrode and a separator interposed therebetween and which have a coiled structure, a folded structure or a layered structure. The electric element of coiled structure or folded structure can be obtained by using a belt-shaped positive electrode, negative electrode and separator interposed therebetween, and the electric element of layered structure by laminating a strip-shaped positive electrode and negative electrode with a separator interposed therebetween and, if necessary, further laminating the above.

The electric element may be those which are used for any of the nickel-hydrogen storage battery, nickel-cadmium battery and lithium battery, and are not particularly limited.

To increase the capacity density of the battery, it is preferable that the electric element has the same square pillar or hexagonal pillar shape as the shape of the case. Such a shape can be attained, for example, by press-forming an electric element of coiled structure. For this purpose, the electric element may be either directly pressed, or it may be inserted into a case and thereafter the case is compression-pressed. By compression pressing, the electric element in the case also can be made to a shape similar to that of the case. On the other hand, to avoid the nonuniformity of electrode reaction between the corner part and the flat part of the electric element, the electric element preferably has a circular pillar shape. Accordingly, the shape of the electric element is appropriately selected according to the intended object.

According to the present invention, the shape of the section of the upper part of the opening part is made circular or elliptic and the case and the sealing plate may be caulked to seal the opening. By use of caulking, the production cost is reduced compared with laser-welding. Further, by use of the case having a circular or elliptic sectional opening, the strain which are largely developed at the corner by caulking when using the case having a square or hexagonal sectional opening is reduced, resultantly, sealing is improved.

Further, the case of the present invention is square barrel or a hexagonal barrel, and its corners ay be rounded or it may be chamferred. To prevent the development of flaws in producing a battery, the corners are preferably rounded.

In the present invention, as described above, he case is made square barrel or hexagonal barrel, hereby the space efficiency in the battery pack is improved. However, as compared with cylindrical pillar batteries, the contact area of the battery is larger and resultantly the temperature in the battery pack becomes higher. In the present invention, therefore, the corner of the battery can be rounded or chamferred with the intention of decreasing the contact area.

Preferably the battery has a square pillar shape; that is, the section of the lower part is square, the section of the corner part forms a part of a circle, and the radius R of the circle and the radius r of a circle inscribed in the square is in a relation of $0.2<R/r<1.0$, preferably $0.3<R/r<0.8$. Here, when the square is a rectangle, the "inscribed circle" means a circle internally touching the longer side.

When $R/r$ is not more than 0.2, the contact area between batteries increases to cause the increase of temperature in the battery pack. Moreover, the occurrence rate of flaws due to the contact between batteries also increases. When $R/r$ is 1.0, the space efficiency in the battery pack decreases. Therefore, $R/r$ is preferably in the above-mentioned range.

Further, the present invention relates to a battery pack comprising the above-mentioned batteries electrically connected in series or in parallel. Preferably it relates to a battery pack comprising square pillar or hexagonal pillar batteries whose corners have been rounded or chamferred, more preferably the section of whose corner forms a part of a circle and the radius R of the circle and the radius r of a circle inscribed in the square are in a relation of $0.2<R/r<1.0$, preferably $0.3<R/r<0.8$, electrically connected in series or in parallel. In a preferred embodiment, a space is formed by the inside surface of the battery pack and the corners of the batteries or a space is formed by the corners of batteries adjacent to each other, to effect heat release. In this space, further, at least one member selected from heat-collecting members, heat-releasing members, heat transfer members, safety members and electric members known to the art (refer, for example, to JP-A-7-14616) may be provided to prevent the temperature increase further.

The heat-collecting member is, for example, a spacer provided between batteries and is preferably made of at least one material having an excellent heat conductivity selected from a heat conductive polymer, aluminum, copper and the like.

The heat transfer member is, for example, a heat pipe; preferably used is a heat pipe having a heat conductivity of about 10 times that of a metal with the same sectional area.

The heat-releasing member is, for example, a heat sink. A fin-type heat sink is preferred to attain an improved heat releasing property. The material used for the heat sink is preferably aluminum, copper or heat-conductive polymer which have a high heat conductivity.

The "safety member" refers to a member which works when an abnormal current or abnormal battery surface temperature is perceived and is, for example, a PTC or thermal protector; preferably at least one thereof or a combination thereof is used.

The "electric member" refers to a member for sensing an abnormal current or abnormal battery surface temperature and is, for example, a substrate which controls the discharge time, current value and discharge pattern in a primary battery and, in a secondary battery, a substrate which controls the current value of charge and discharge, charge and discharge time, charge and discharge voltage and charge and discharge pattern, and a thermistor which measures the battery surface temperature or temperature in the battery pack.

The battery of the present invention may be produced by a process which comprises the steps of forming an electric element by interposing a separator between a positive electrode and a negative electrode, housing the electric element in a case having an opening wherein the section of the lower part is square or hexagonal and the section of the upper part is circular or elliptic, placing a circular or elliptic sealing plate on the opening of the case and caulking the case with the sealing plate to effect sealing.

More preferably, the battery of the present invention may be produced by a process which comprises the steps of interposing a separator between a belt-shaped positive electrode and negative electrode and spirally coiling them with the terminal edge of the positive electrode being projected upwards and the terminal edge of the negative electrode being projected downwards, to construct an electric element, bonding a current collector to the terminal edge of the positive electrode and the terminal edge of the negative electrode of the electric element, housing the electric element in a case of which the section of the upper part is circular or elliptic and the section of the lower part is square or hexagonal, bonding the negative electrode current collector with the case, placing a circular or elliptic sealing plate on the opening of the case and sealing the opening by caulking the case with the sealing plate.

A modification of the above process which may be used comprises preliminarily providing a current-collecting lead to the positive electrode of the said electric element and, without bonding the lower part negative electrode current collector, contacting the outermost peripheral negative electrode of the electric element to the inside of the case, to effect current collection.

Further, the battery of the present invention may be produced by a process which comprises the steps of interposing a separator between a positive electrode and a negative electrode to form an electric element, housing the electric element in a case having a square or hexagonal sectional opening, subjecting the opening to a metal forming processing to work up the section of the opening into a circular or elliptic shape, placing a circular or elliptic sealing plate on the opening of the case and sealing the opening by caulking the case with the sealing plate.

More preferably, the battery of the present invention may be produced by a process which comprises the steps of interposing a separator between a belt-shaped positive electrode and negative electrode and spirally coiling them with the terminal edge of the positive electrode being projected upwards and the terminal edge of the negative electrode being projected downwards, to construct an electric element, bonding a current collector to the terminal edge of the positive electrode and the terminal edge of the negative electrode of the electric element, housing the electric element in a case having a square or hexagonal section, bonding the negative electrode current collector with the case, subjecting the opening of the upper part to a roll-processing wherein the opening is put on a circular or elliptic inner die, then rotated while being pushed from the underside, and pressed down with a roll die rotating in the opposite direction; to a roll-swaging processing wherein the opening of the upper part is beaten with 2 or 3 pressing outer dies; or a pressure forming processing using a circular or elliptic die thereby to form the opening into the shape of a circle or an ellipse, sealing the opening with a circular or elliptic sealing plate and then caulking the case with the sealing plate to effect sealing.

In the former process, the electric element is inserted in a case of which the shape of the upper part has already been formed, and hence production can be conducted easily though the space efficiency in the case is lower than in the latter process. In the latter process, the shape of the upper part of the case is formed after inserting the electric element in the case, and hence production would be conducted with some difficulty, but the space efficiency in the case for the electric element is high. Either of the processes may be selected according to the intended object.

In both of the above-mentioned processes, the electric elements used are those having a coiled structure, folded structure or layered structure described above. In the latter process wherein a square barrel case is used, since the shape of the opening is square, electric elements of a folded structure or a layered structure also can be inserted easily. The shape of the lower part of the case in which the electric element is inserted is preferably, as described before, a square barrel or a hexagonal barrel of which the corners have been rounded or chamferred, more preferably the section of the corner forms a part of a circle and the radius R of the circle and the radius r of a circle inscribed in the square are in a relation of $0.2<R/r<1.0$, preferably $0.3<R/r<0.8$. Such shapes can be formed by metal processing methods known to those skilled in the art.

The structure of the upper part of the case used in the former process may be obtained by subjecting the opening of a case which has a square or hexagonal section to metal processing, preferably to a roll-processing by putting the opening of the case having a square or hexagonal section on an inner die having a circular or elliptic section, to a roll-swaging processing wherein the opening is beaten with a pressing outer die of 2-die type or 3-die type which forms a circular or elliptic shape, or to a pressure forming processing using a circular or elliptic die.

The dimension of the circle or elliptic section of the upper part of the case may be selected appropriately according to the dimension of the electric element to be inserted, it is preferably 60–95% relative to the dimension of the section of the lower part of the case.

BEST MODE FOR CARRYING OUT THE INVENTION

The present invention is described in detail below with reference to Examples, but it is not limited by these Examples.

EXAMPLE 1

An electric element 4 was constructed by interposing a separator 3 between a belt-shaped positive electrode 1 and a belt-shaped negative electrode 2 and spirally coiling them with the terminal edge 1a of the positive electrode 1 being projected upwards and the terminal edge 2a of the negative electrode 2 being projected downwards.

An upper current collector 5 having a hole at the center was resistance-welded to the terminal edge 1a of the positive electrode 1 of the electric element 4, and a lower current collector 6 having a tongue 6a was resistance-welded to the terminal edge 2a of the negative electrode 2.

A sealing plate 7 was constructed by arraying a filter 7b having a valve-opening 7a and a rubber valve body 8, placing a cap-formed terminal 7c thereon, and resistance-welding the filter 7b with the cap-formed terminal 7c.

A metal case 9 for batteries was made by rotating a square barrel-shaped case while pushing it up from the underside, putting its opening on a circular inner die, pressing it down with a roll die rotating in the opposite direction to form the upper part into the shape of a circle, and mending thickness unevenness caused by the processing with a metal cutter.

In place of the above-mentioned roll-processing, there may also be used a roll-swaging processing wherein the opening of the case is processed by beating it with 2 or 3 pressing outer dies which can form the shape of a circle, or a pressure forming processing.

The electric element 4 was housed in the metal case 9 of which the upper part section was circular and the lower part section was square, an electrode bar was inserted from the central hole of the upper current collector 5 and, while the bar being pressed against the tongue 6a of the lower current collector 6, the tongue 6b was resistance-welded to the bottom of the metal case 9.

An insulation ring 10a and the filter 7b were arranged in said order on the electric element 4, then grooving was applied to the upper part of the metal case 9, and an alkaline electrolyte was poured into the electric element 4 through the central hole of the upper current collector 5.

One end of a lead tab 11 was resistance-welded to the upper current collector 5 and the other end of the lead tab 11 was resistance-welded to the filter 7b of the sealing plate 7.

Figure 1:
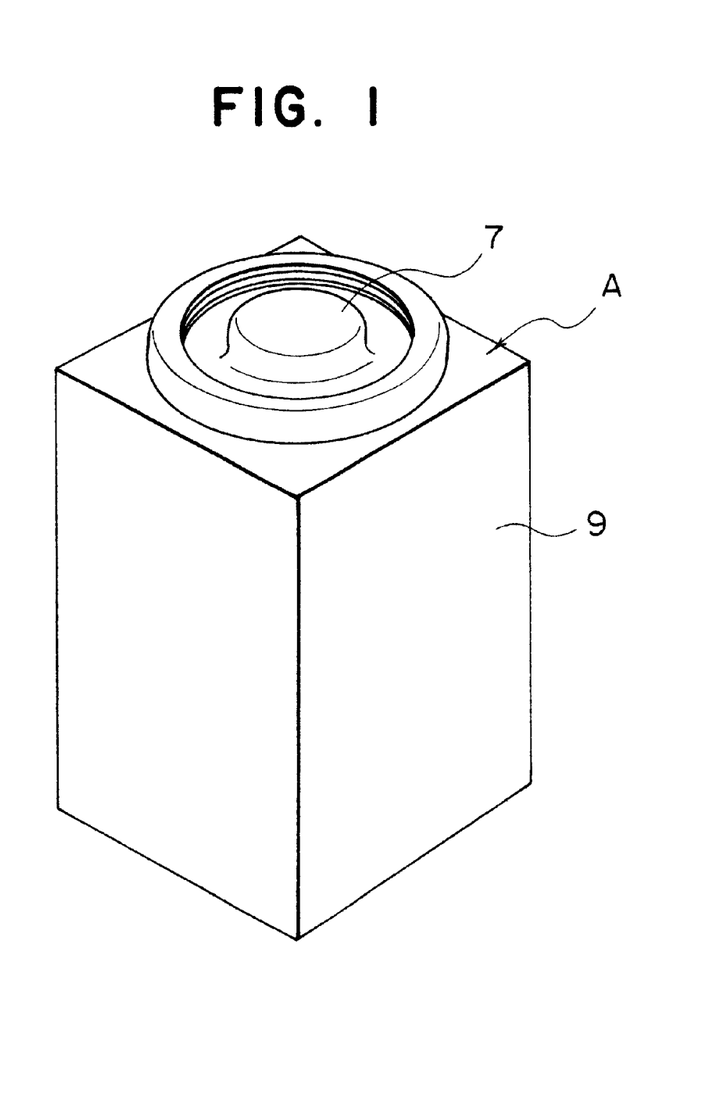
FIG. 1 is a perspective view of a battery in Example 1 of the present invention.
Figure 2:
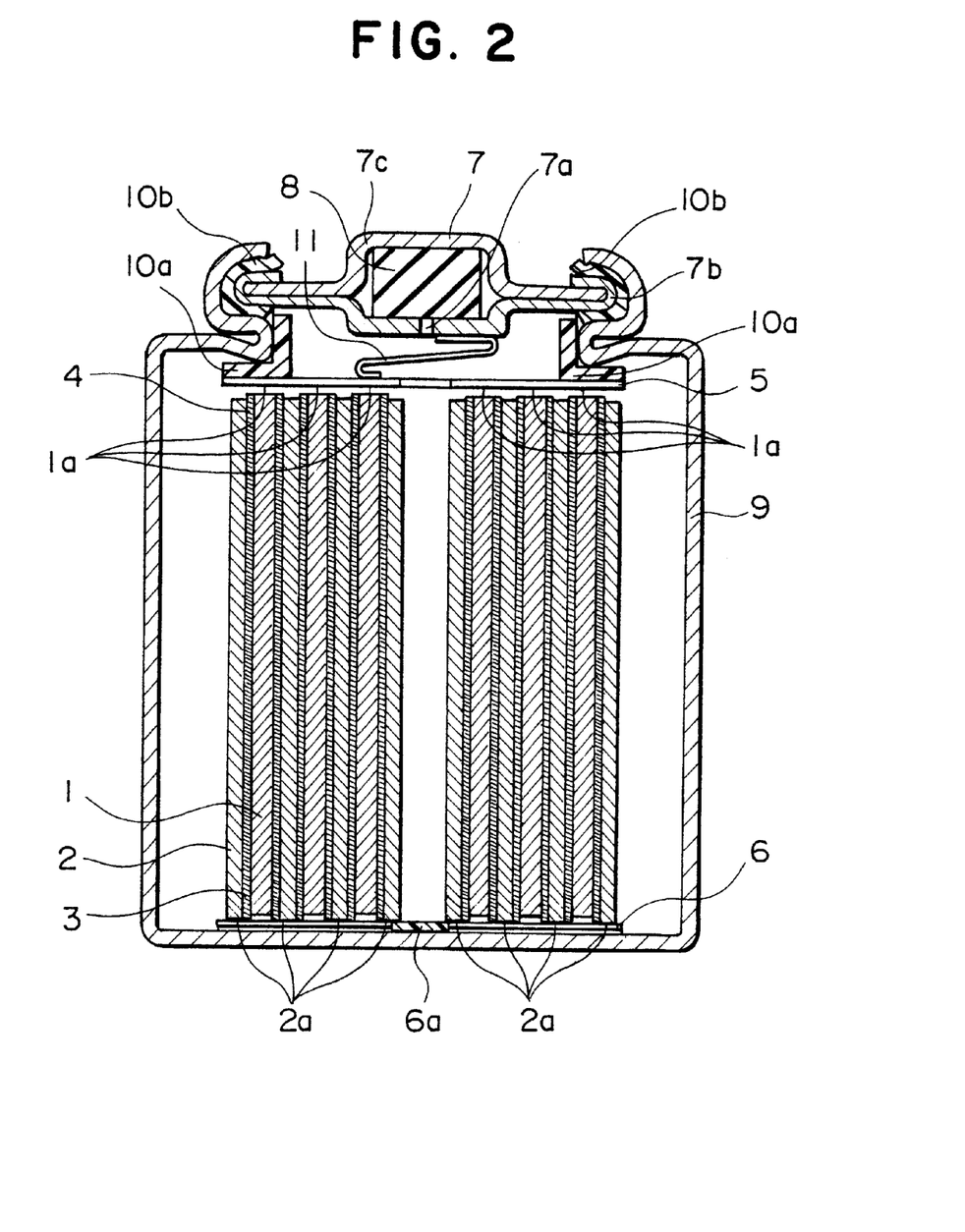
FIG. 2 is a longitudinal sectional view of the battery of FIG. 1.
Figure 3:
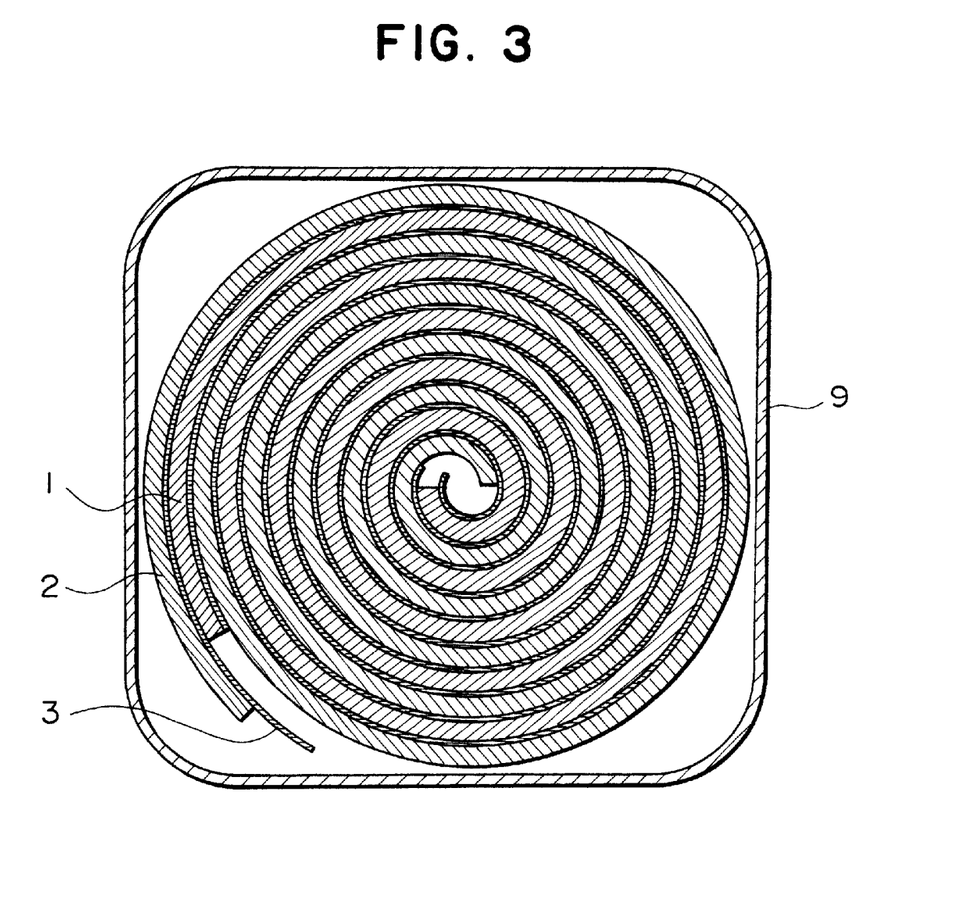
FIG. 3 is a transverse sectional view of the battery of FIG. 1.

The upper part of the metal case 9 was caulked towards inside, with an insulation ring 10b being interposed between the metal case 9 and the filter 7b of the sealing plate 7, to effect sealing and thus to construct a battery A. FIG. 1 is a perspective view of the battery A, FIG. 2 is a longitudinal sectional view of the battery A cut at the center of the width direction, and FIG. 3 is a transverse sectional view of the battery A cut at the center of the length direction.

Figure 4:
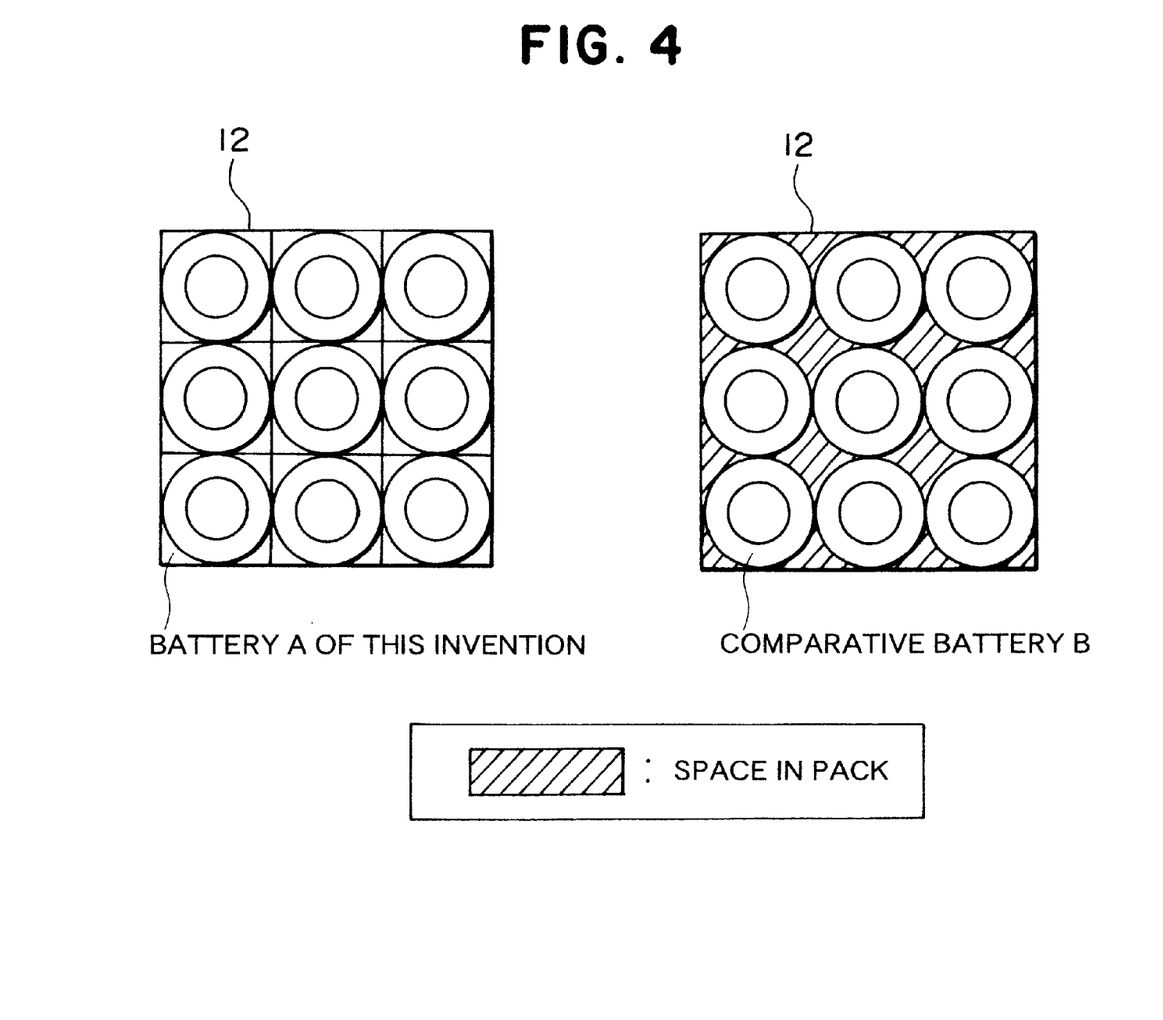
FIG. 4 is a schematic plan view comparing the space efficiency in the pack of a battery in the Example 1 of the present invention with that of a prior cylindrical pillar battery.

FIG. 4 shows plan views of packs for power tools respectively housing, in a battery pack case 12, nine (three rows of three batteries each) of the batteries A of the Example and, as a Comparative Example, of cylindrical pillar batteries B.

It can be seen that the battery pack housing the battery A of the present invention has a less space in the battery pack and hence a higher space efficiency than the pack housing the battery B of Comparative Example.

EXAMPLE 2

In Example 1, description was given of an example wherein an electric element was inserted in a case of which the shape of the upper part had been already formed. In the present Example, description is given of battery production steps wherein the electric element is inserted first and then the shape of the case is formed with reference to the schematic diagram shown in FIG. 5. In the following description, some of the reference numerals used are not shown in FIG. 5.

Figure 5:
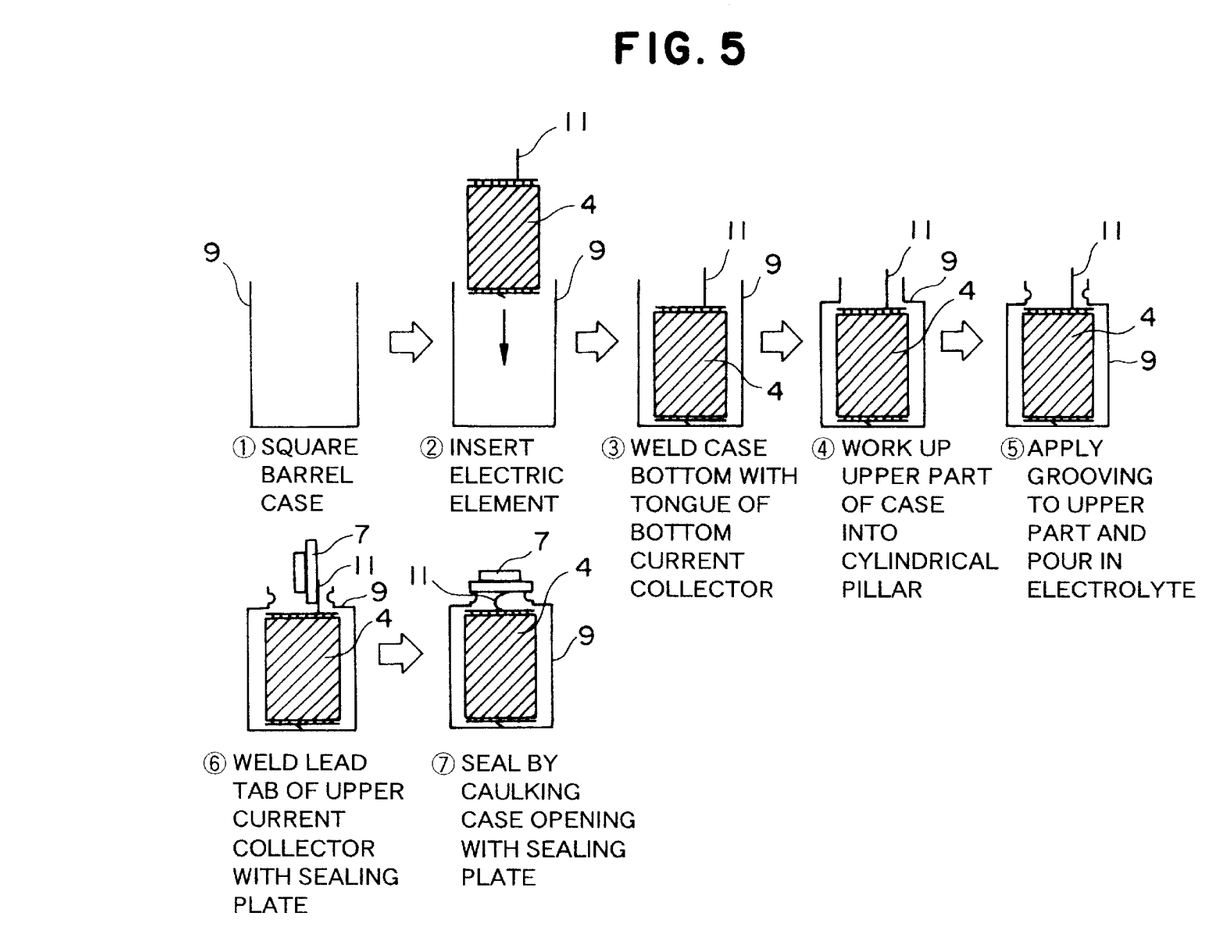
FIG. 5 is a flow diagram showing the battery production steps in Example 2 of the present invention.

Reference is made to FIG. 5. An electric element 4 was constructed by interposing a separator 3 between a belt-shaped positive electrode 1 and a belt-shaped negative electrode 2 and spirally coiling them with the terminal edge of the positive electrode 1 being projected upwards and the terminal edge of the negative electrode 2 being projected downwards. To the terminal edge 1a of the positive electrode 1 of the electric element 4 constructed above were resistance-welded an upper current collector 5 having a hole at the center and further a lead tab 11. A lower current collector 6 having a tongue 6b was resistance-welded to the terminal edge 2a of the negative electrode 2.

A sealing plate 7 was constructed by arranging a filter 7b and a rubber valve body 8, placing a cap-formed terminal 7c thereon, and resistance-welding the filter 7b with the cap-formed terminal 7c.

The electric element 4 was housed in a square barrel-shaped metal case 9, an electrode bar was inserted from the central hole of the upper current collector 5 and, while the bar being pressed against the tongue 6a of the lower current collector 6, the tongue 6a was resistance-welded to the bottom of the metal case 9.

An insulation ring 10a was arranged on the electric element 4, the upper part of the square barrel-shaped metal case 9 was deformed into a circular shape by roll-processing, then grooving was applied to the upper part of the metal case 9, and an alkaline electrolyte was poured into the electric element 4 from the central hole of the upper current collector 5.

Then, the other end of the lead tab 11 was resistance-welded to the filter 7b of the sealing plate 7. The upper part of the metal case 9 was caulked toward the inside, with an insulation ring 10b being interposed between the metal case 9 and the filter 7b of the sealing plate 7, to effect sealing and thus to construct a battery.

EXAMPLE 3

Figure 6:
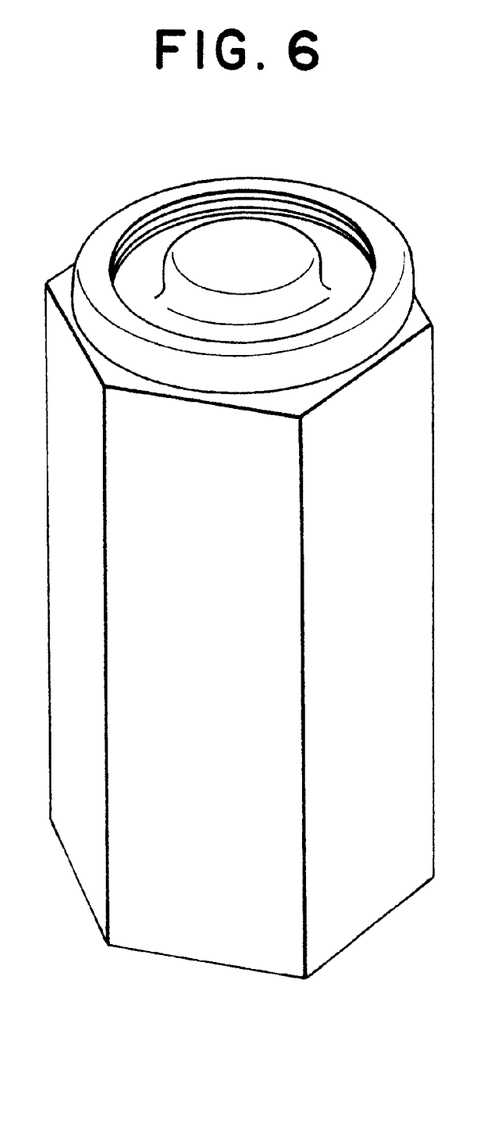
FIG. 6 is a perspective view of a battery in Example 3 of the present invention.
Figure 7:
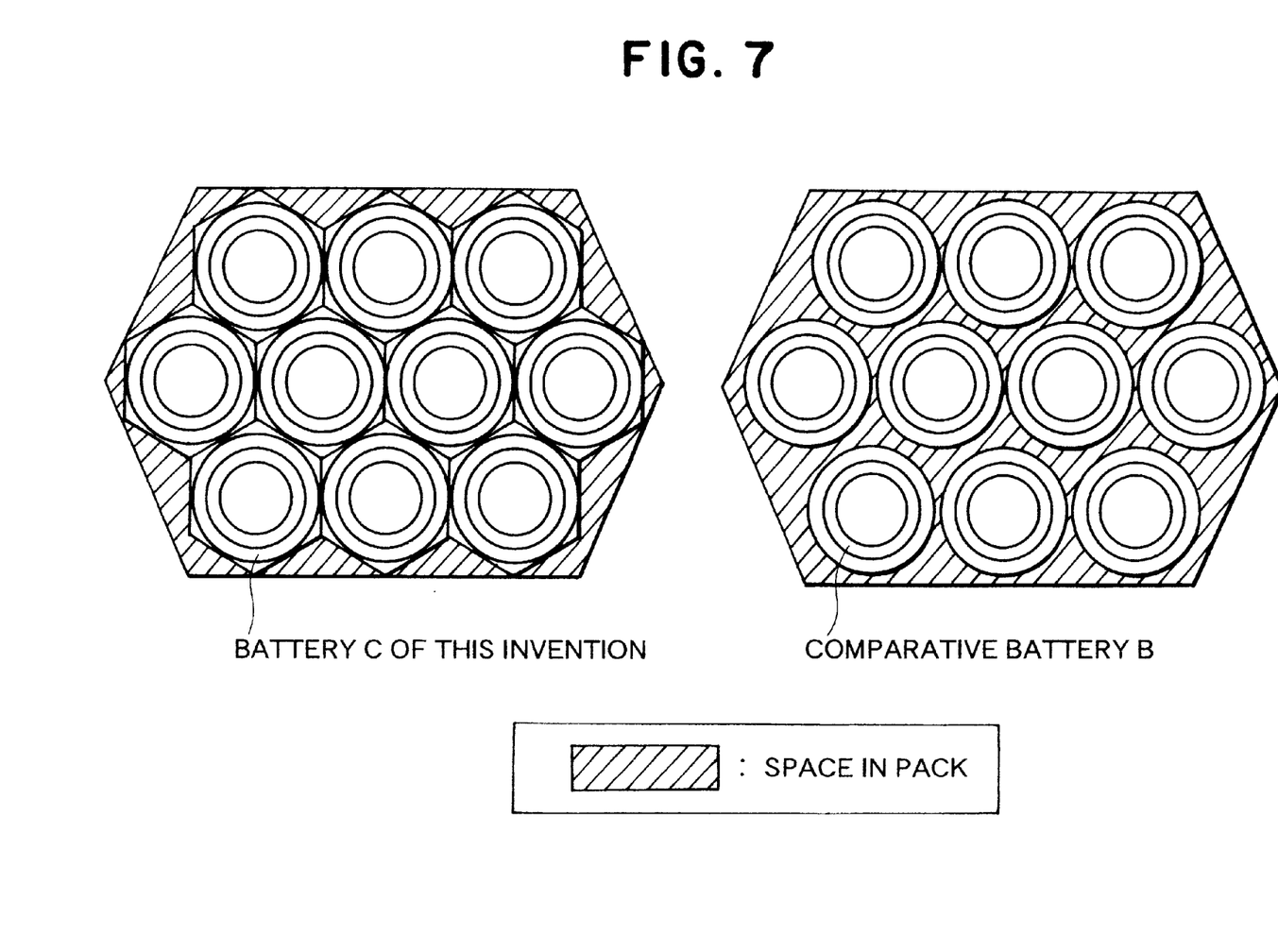
FIG. 7 is a schematic plan view comparing the space efficiency in the pack of a battery in the Example 3 of the present invention with that of a prior cylindrical pillar battery.

A battery C was made in the same manner as in Example 2 but by using a hexagonal barrel case. The perspective view of the battery C is shown in FIG. 6. A plan view of a battery pack for power tools constructed by closely packing the battery C is shown in FIG. 7. As a Comparative Example, a battery pack employing the cylindrical pillar battery B of Comparative Example hitherto used is also shown in FIG. 7.

It can be seen that the space utilization ratio in the battery pack is higher in the battery pack using the battery of the present invention of which the upper part is circular and the lower part is hexagonal than in the pack using the battery B of Comparative Example and that the battery of this invention thus makes it possible to utilize the space in the battery pack with higher efficiency.

EXAMPLE 4

Figure 8:
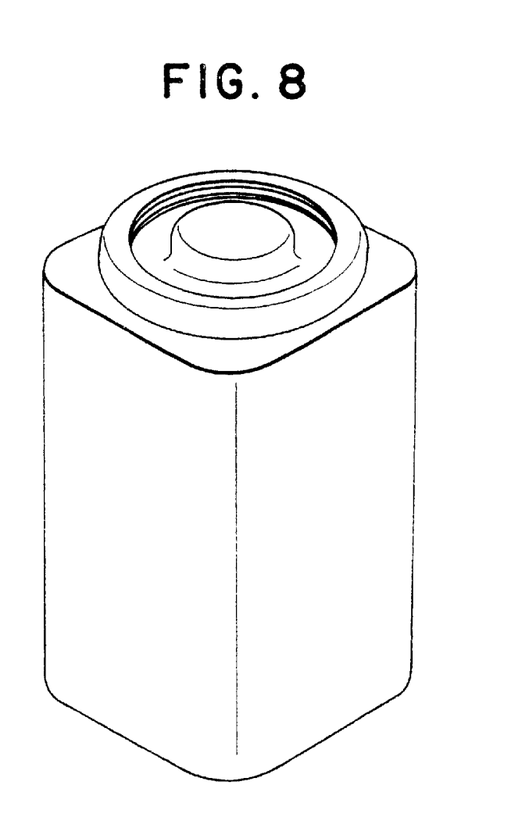
FIG. 8 is a perspective view of a battery in Example 4 of the present invention.

A battery D of the present invention was made in the same manner as in Example 1 except for using, as the case for the battery D, a case which is a square barrel and its corners have been metal-processed so that r may be 11 and R may be 8, namely R/r may be 0.73. The perspective view of the battery D is shown in FIG. 8.

Figure 9:
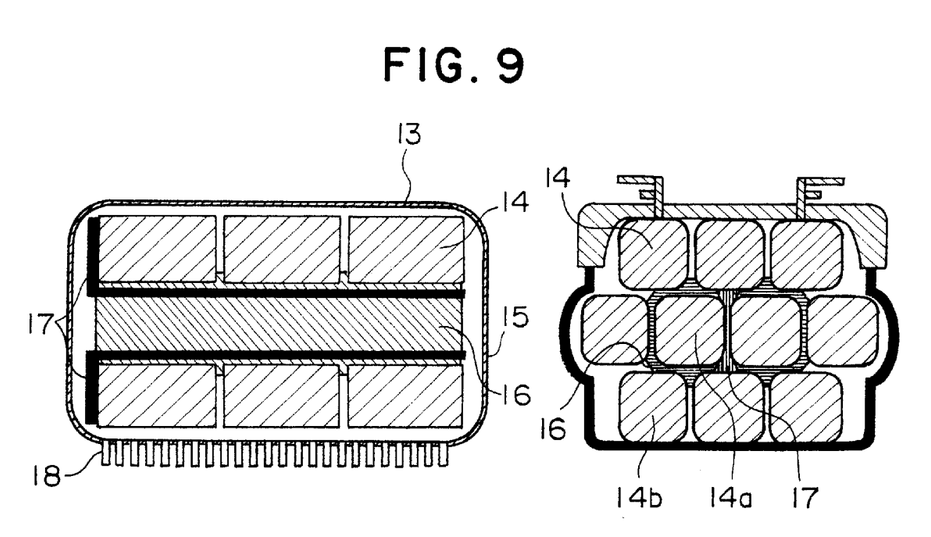
FIG. 9 shows a longitudinal and a transverse sectional views of a battery pack for power tools in Example 4 of the present invention.

The longitudinal sectional view and the transverse sectional view of the battery pack made by using the battery D are shown in FIG. 9. Such a battery pack can be favorably used as the power source of power tools driven by batteries, for example, electric drills, electric planes, electric grinders and electric files.

In these power tools, at the time of discharge of the battery (that is, when the power tool is in operation), the motor in the power operates and the battery in the battery pack discharges. This discharge causes a flow of electric current [I] of about 10–70A. When a plurality of batteries are connected in series or in parallel, Joule heat is generated owing to the resistances [X] including the internal resistances of the respective batteries and the resistances of connecting leads which electrically connect between the respective batteries 1. The Joule heat [Q] is expressed by $Q=I^2X$.

Therefore, as the driving power of power tools becomes higher, the heat generation increases. Accordingly, with the increase of battery capacity attendant on the use of tools of higher power, the suppression of heat generation in the pack is eagerly desired for battery packs for power tools.

The battery pack 13 shown in FIG. 9 has been constructed by using a plurality of nickel-hydrogen batteries 14 in which the radius R provided at the corners of the square pillar battery is, as described before, in a relation of R/r=0.73 with the radius r of the case. As shown in FIG. 9, the battery 14 positioned at the central part is surrounded by other batteries 14b. However, since the corners have been rounded, the heat releasing property of the pack is improved as compared with a pack wherein common square pillar batteries are used by virtue of the space formed by the corners of adjacent batteries. In the present Example, further, the central battery 14a is covered with a heat-collecting member 16, e.g., a metal spacer formed of a metal having an excellent heat conductivity.

The heat evolved from the battery 14 by the discharge thereof is efficiently collected at the heat-collecting member 16. The collected heat is transferred to a heat transfer member 17, such as a heat pipe, having an excellent heat conductivity and provided so as to be in contact with the heat-collecting member 16, and then released by a heat-releasing member 18, such as a fin-type heat sink, provided on the outside of the battery case 15.

Figure 10:
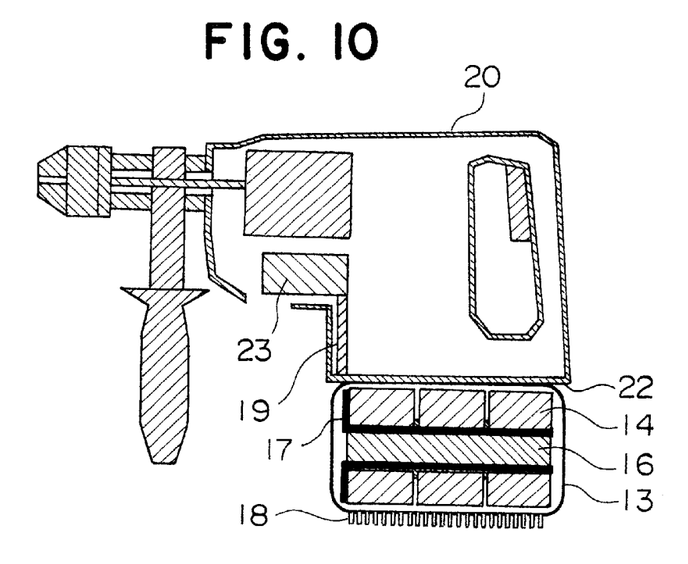
FIG. 10 is a longitudinal sectional view of a power tool in the Example 4 of the present invention.

As shown in FIG. 10, when the battery pack 13 is set in the power tool 20, it is placed such that the heat transfer member 17 and an external heat-collecting member 22 provided to the power tool 20 may closely contact with each other.

Consequently, the heat collected by the heat-collecting member 16 is easily transferred, via the heat transfer member 17, to the external heat-collecting member 22, and is further transferred, via an external heat pipe 19 provided also to the power tool 20, to an external heat sink 23. In this manner, the heat evolved in the battery pack 1 is released to the outside of the tool from the external heat sink 23.

The cooling power of the external heat sink 23 used in the above Example is about 10–12 W. As a result, by adopting the structure of the above-mentioned Example, the temperature increase could be suppressed by at least about 10° C. at the time of discharge of the battery 2.

Though, in the above Example, a fin-type heat-releasing member was used as the heat sink 18 in the battery pack 13 and a lattice-type heat-releasing member as the heat sink 23 of the power tool 20, such members are not limited thereto, and other heat-releasing members of suitable shapes which can exhibit a cooling power respectively equal thereto may be used.

The materials for the heat sink 18, heat transfer member 17, heat-collecting member 16, external heat-collecting member 22 and external heat sink 23 may be any of aluminum, copper and heat conductive polymer or a combination thereof.

The heat conductive polymer used may be composite polymeric materials obtained by mixing alumina, boron nitride or the like each having an excellent heat conductivity with a polymer such as silicone rubber, resin or the like.

Though a battery wherein R/r is 0.73 was used in the above Example, a similar effect can also be obtained with a battery wherein 0.2<R/r<1.0.

EXAMPLE 5

Figure 11:
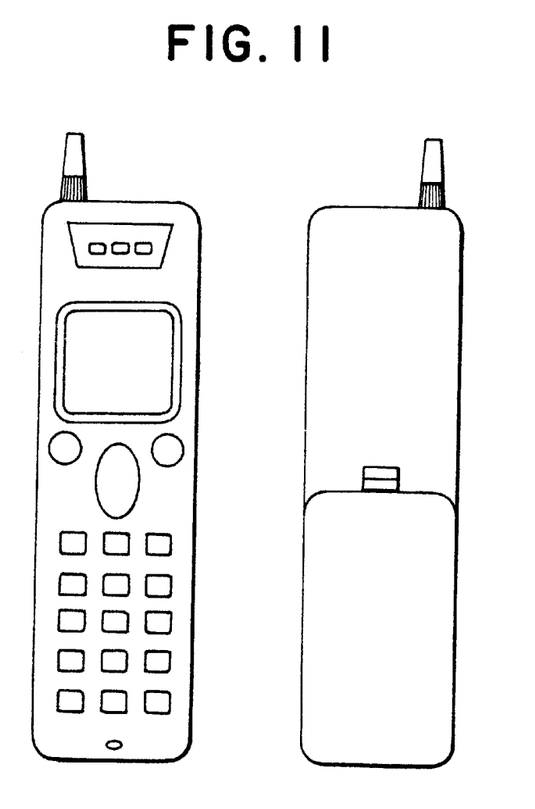
FIG. 11 is a drawing showing the front side and the rear side of a portable telephone in Example 5 of the present invention.
Figure 12:
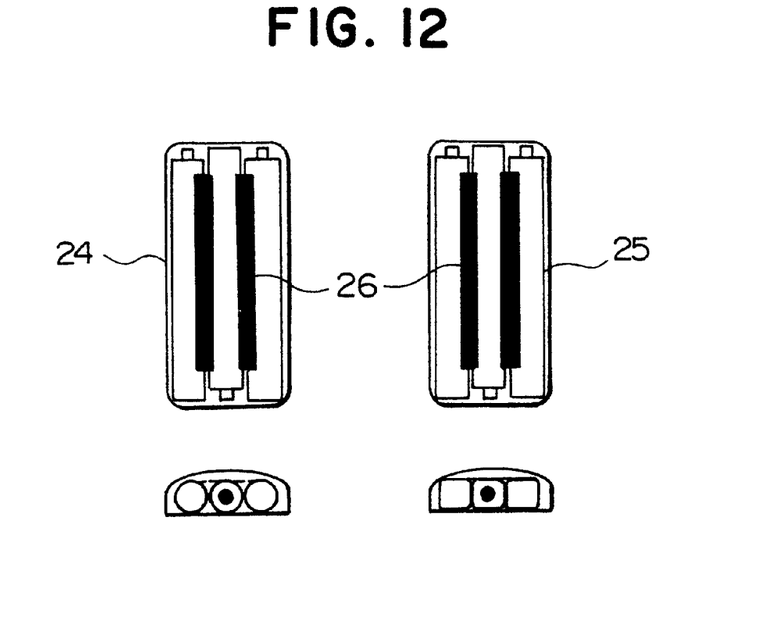
FIG. 12 is a sectional view of a battery pack for the above portable telephone.

The front view and the rear view of a portable telephone in the Example of the present invention are shown in FIG. 11, and the internal structure diagram and the sectional view of a battery pack for the portable telephone are shown in FIG. 12, which are explained in detail below.

With the rapid development of information oriented society of recent years, the rate of spread of the use of portable telephones is increasing year by year. Along therewith, portable telephones which are smaller in size and lighter in weight and can be used for a longer time are eagerly desired by customers.

FIG. 11 shows the front view and the rear view of a portable telephone in the Example of the present invention. FIG. 12 shows the internal structure diagram and the sectional view of a battery pack 25 using the square pillar battery of the present invention wherein R of its corner and the radius r of the case are in a relation of R/r=0.5, and further shows, as a Comparative Example, the internal structure diagram and the sectional view of a battery pack 24 using a cylindrical pillar battery which is presently employed for the battery pack of portable telephones.

It can be seen that there is more space inside the battery pack 24 used at present than in the battery pack 25 using the battery of the present invention, namely that the former battery pack is poorer in space efficiency. For attaining the maximum space efficiency, it might be thought of using a square pillar battery having no R at the corner. In such a case, however, since there are required in a battery pack a plurality of secondary batteries capable of being charged and discharged, a member for controlling the charge and discharge and a safety member 26 which operates at the time of abnormal current and abnormal battery surface temperature, a space for housing the above-mentioned members must be provided anew.

In the battery pack of the present invention, as shown in FIG. 12, the corner of the square pillar battery is rounded in advance and, at the time of constructing a battery pack, the space formed by the corners of adjacent square pillar batteries is used for housing an electric member for controlling the charge and discharge and a safety member which operates at the time of abnormal electric current and sudden increase of battery surface temperature, whereby the space in the pack can be utilized more effectively.

EXAMPLE 6

Figure 13:
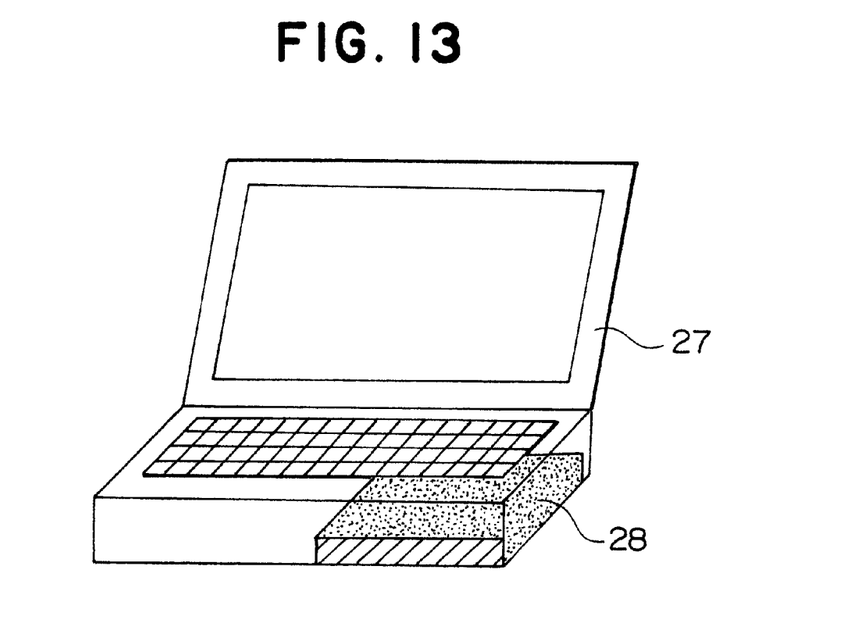
FIG. 13 is a perspective view of a notebook-sized personal computer in Example 6 of the present invention.
Figure 14:
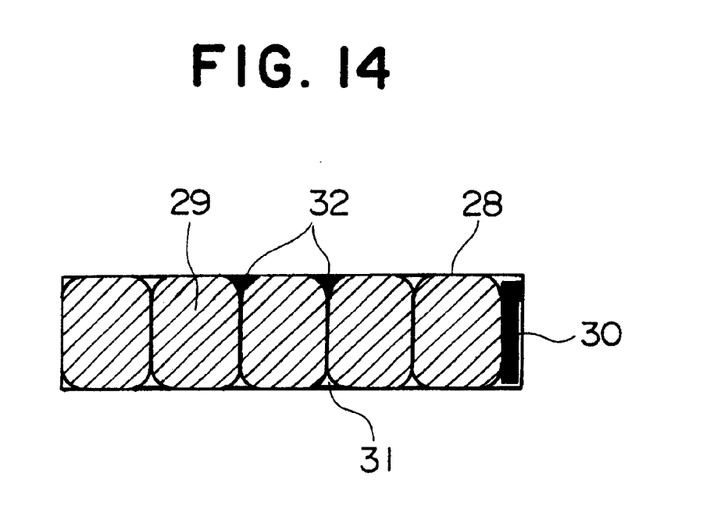
FIG. 14 is a sectional view of the battery pack for the above notebook-sized personal computer.

A notebook-sized personal computer in the Example of the present invention is shown in FIG. 13 and the sectional view of a battery pack mounted on the notebook-sized personal computer in FIG. 14, which are explained in detail below.

The battery pack 28 housed in the notebook-sized personal computer main body 27 raises its temperature to about 60° C. owing to the heat generation of the computer main body. When the ambient temperature of the battery reaches a temperature higher than ordinary temperature, particularly 50° C. or above, the discharge characteristic and charge characteristic are deteriorated and further the charge-discharge cycle life characteristic is deteriorated. Accordingly, a battery pack having a section as shown in FIG. 14 was constructed, for suppressing the temperature rise in the battery pack to the minimum, by using a square pillar battery 29 of the present invention of which R of the corner is in a relation of R/r=0.45 with the radius r of the battery case and using the space in the battery pack effectively.

In the battery pack are housed an electric member 30 for controlling charge and discharge, a heat-releasing member 31 for suppressing the heat generation of the personal computer main body and the heat generation of the battery main body and a safety member 32 which operates at the time of abnormal current and abnormal battery surface temperature. The heat-releasing member 31 and the safety member 32 are housed in the space formed by the corner parts of adjacent square pillar batteries of the present invention, whereby the space in the battery pack can be utilized to the maximum.

Industrial Applicability

As set forth above, according to the present invention, a battery can be provided which is improved in productivity and which improves the space efficiency when mounted in battery packs or on appliances. In such a battery, further, the temperature rise in the battery pack can be suppressed by rounding or chamferring the corners of the battery.

What is claimed is:

1. A battery comprising an electric element, a case having an opening and a sealing plate, the opening being sealed with the sealing plate, wherein the case comprises a lower part comprising the electric element and an upper part comprising the sealing plate, a section of the lower part being square and the corner being chamferred or the corner forms a part of a circle, and a radius R of the circle and a radius r of a circle inscribed in the square are in a relation of 0.2<R/r<1.0 or a section of lower part being hexagonal and corners thereof are rounded or chamferred, and a section of the upper part being circular or elliptic.

2. The battery according to claim 1 wherein the electric element has a coiled structure, a folded structure or a layered structure each formed of a positive electrode, a negative electrode and a separator interposed therebetween.

3. The battery according to claim 1 wherein the opening and the sealing plate are caulked to effect sealing.

4. A battery pack comprising the batteries according to any one of the claims 1–3 electrically connected in series or in parallel.

5. A battery pack comprising the batteries of any one of the claims 1–3 electrically connected in series or in parallel, wherein at least one member selected from the group consisting of heat-collecting members, heat-releasing members, heat transfer members, safety members and electric members is placed in a space formed by a inside surface of the battery pack and the corners of the batteries or a space formed by the corners of adjacent batteries.

6. The battery pack according to claim 5 wherein the heat-collecting member is made of at least one material selected from the group consisting of aluminum, copper and heat conductive polymers.

7. The battery pack according to claim 5 wherein the heat-releasing member has a heat sink.

8. The battery pack according to claim 5 wherein the heat transfer member has a heat pipe.

9. A process for producing a battery which comprises:

forming an electric element by interposing a separator between a positive electrode and a negative electrode, housing the electric element in a case having an opening wherein a section of the lower part being square and the corner being chamferred or the corner forms a part of a circle, and a radius R of the circle and a radius r of a circle inscribed in the square are in a relation of 0.2<R/r<1.0 or a section of lower part being hexagonal and corners thereof are rounded or chamferred, and a section of a upper part is circular or elliptic, placing a circular or elliptic sealing plate on the opening of the case, and caulking the case with the sealing plate to effect sealing.

10. A process for producing a battery which comprises:

forming an electric element by interposing a separator between a positive electrode and a negative electrode, housing the electric element in a case having an opening wherein a section being square and the corner being chamferred or the corner forms a part of a circle, and a radius R of the circle and a radius r of a circle inscribed in the square are in a relation of 0.2<R/r<1.0 or a section being hexagonal and corners thereof are rounded or chamferred, subjecting the opening to a metal forming processing to form a section of the opening into a circular shape or elliptic shape, placing a circular or elliptic sealing plate on the opening of the case, and caulking the case with the sealing plate to effect sealing.

11. The process according to claim 10 wherein the metal forming processing is a roll-processing, a roll-swaging processing or a pressure forming processing.

12. The process according to claim 9 or 10 wherein the electric element is formed in a coiled structure, a folded structure or a layered structure.

13. A process for producing a battery case having a section of a lower part being square and the corner being chamferred or the corner forms a part of a circle, and a radius R of the circle and a radius r of a circle inscribed in the square are in a relation of 0.2<R/r<1.0 or a section of lower part being hexagonal and corners thereof are rounded or chamferred, and a section of an upper part is circular or elliptic, which process comprises a step of subjecting an opening of a case of which a section is square or hexagonal to a metal forming processing to form a section of the opening into a circular shape or elliptic shape.

14. The process according to claim 13 wherein the metal forming processing is a roll-processing, a roll-swaging processing or a pressure forming processing.

* * * * *